(12) United States Patent
Ballerio et al.

(10) Patent No.: US 8,074,921 B2
(45) Date of Patent: Dec. 13, 2011

(54) HELICOPTER ROTOR

(75) Inventors: Dante Ballerio, Caronno Varesino (IT); Fabio Nannoni, Novara (IT)

(73) Assignee: Agusta, S.p.A., Samarate (IT)

( * ) Notice: Subject to any disclaimer, the term of this patent is extended or adjusted under 35 U.S.C. 154(b) by 341 days.

(21) Appl. No.: 12/583,064

(22) Filed: Aug. 13, 2009

(65) Prior Publication Data
US 2010/0038469 A1 Feb. 18, 2010

(30) Foreign Application Priority Data

Aug. 14, 2008 (EP) .................................. 08425564

(51) Int. Cl.
*B64C 27/82* (2006.01)
(52) U.S. Cl. ............... 244/17.19; 244/17.11; 416/134 A
(58) Field of Classification Search ............... 244/17.19, 244/17.11, 17.21; 416/134 A, 248, 106
See application file for complete search history.

(56) References Cited

U.S. PATENT DOCUMENTS

| | | | | |
|---|---|---|---|---|
| 4,886,419 A | * | 12/1989 | McCafferty | 416/134 A |
| 5,131,604 A | * | 7/1992 | Yoerkie et al. | 244/17.19 |
| 5,330,322 A | * | 7/1994 | Aubry | 416/134 A |
| 5,738,494 A | * | 4/1998 | Schmaling | 416/134 A |
| 6,287,076 B1 | | 11/2001 | Mouille | |
| 6,929,215 B2 | * | 8/2005 | Arlton | 244/17.11 |
| 2002/0136636 A1 | * | 9/2002 | Sehgal et al. | 416/104 |
| 2009/0084891 A1 | * | 4/2009 | Darrow et al. | 244/17.19 |
| 2010/0163668 A1 | * | 7/2010 | Nannoni et al. | 244/17.21 |

FOREIGN PATENT DOCUMENTS

FR  2775951  9/1999

OTHER PUBLICATIONS

Search Report in European Application No. 08425564 dated Jan. 13, 2009.

* cited by examiner

*Primary Examiner* — Christopher P Ellis
(74) *Attorney, Agent, or Firm* — McCracken & Frank, LLC

(57) ABSTRACT

A rotor for a helicopter, the rotor having a drive shaft rotating about a first axis; a hub connected functionally to the drive shaft in angularly fixed manner with respect to the first axis and in rotary manner with respect to a second axis crosswise to the first axis; and two blades connected to the hub in angularly fixed manner with respect to the first and second axis and in rotary manner with respect to respective third axes; the rotor also having supporting means for supporting the blades with respect to the hub in rotary manner about the respective third axes; the supporting means having at least one supporting member made at least partly of elastomeric material and interposed between a first surface and a second surface integral with a respective blade and the hub respectively; and the supporting member deforming, in use, to permit rotation of the blade, with respect to the hub, about the respective third axis.

17 Claims, 5 Drawing Sheets

HELICOPTER ROTOR

The present invention relates to a helicopter rotor.

BACKGROUND OF THE INVENTION

Helicopters are known comprising a fuselage; a main rotor mounted on top of a central portion of the fuselage; and an antitorque tail rotor for counteracting the torque transmitted by the main rotor to the fuselage.

So-called teetering or see-saw antitorque tail rotors are also known, which substantially comprise a drive shaft rotating about a first axis of rotation crosswise to a second axis of rotation of the main rotor; a hub connected functionally to the drive shaft in angularly integral manner about the first axis, and free to oscillate about the drive shaft about a third axis perpendicular to the first axis; and a number of blades projecting from the hub on opposite sides of the drive shaft.

More specifically, the blades are angularly integral with the hub about the third axis, can rotate about the hub about respective fourth axes crosswise to the first and third axis, and extend longitudinally along the respective fourth axes.

The hub thus rotates the blades about the first axis, and allows the blades to rotate, by external control, about the respective fourth axes to adjust the respective angles of attack with respect to the airflow. The hub also allows the blades to oscillate integrally with one another about the third axis to "flap" the blades.

Known see-saw rotors also comprise supporting means for supporting the blades with respect to the hub, and which, more specifically, allow the blades to rotate about the hub along the respective fourth axes.

See-saw rotors are particularly advantageous for helicopters, by comprising few component parts.

A need is felt within the industry for see-saw antitorque tail rotors designed to minimize wear and so ensure a high degree of dependability.

A need is also felt within the industry to reduce transmission to the hub, and hence to the fuselage, of vibration and noise generated by rotation of the blades, at least over predetermined frequency ranges.

SUMMARY OF THE INVENTION

It is an object of the present invention to provide a helicopter rotor designed to achieve at least one of the above demands cheaply and easily.

According to the present invention, there is provided a helicopter rotor as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
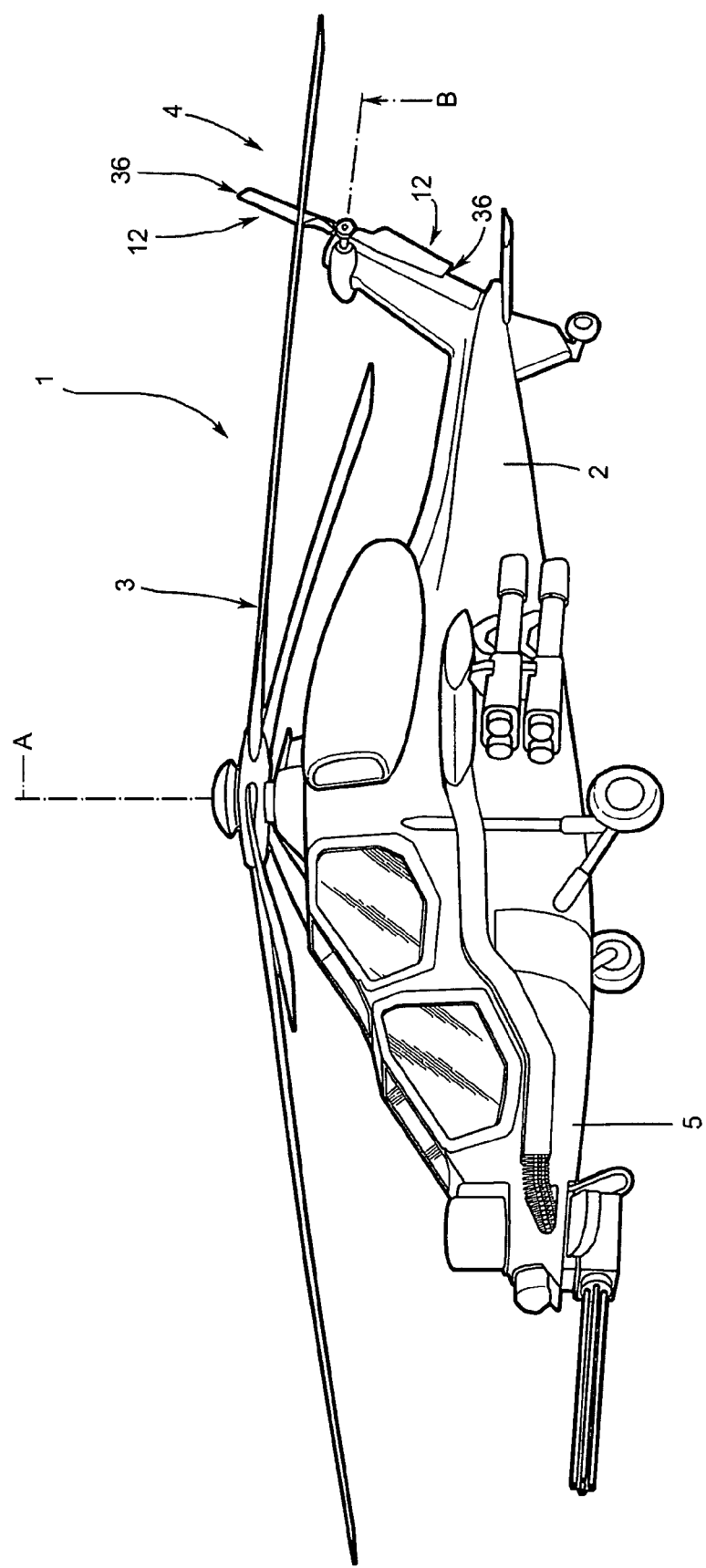
FIG. 1 shows a view in perspective of a helicopter comprising a two-bladed antitorque tail rotor in accordance with the present invention.
Figure 2:
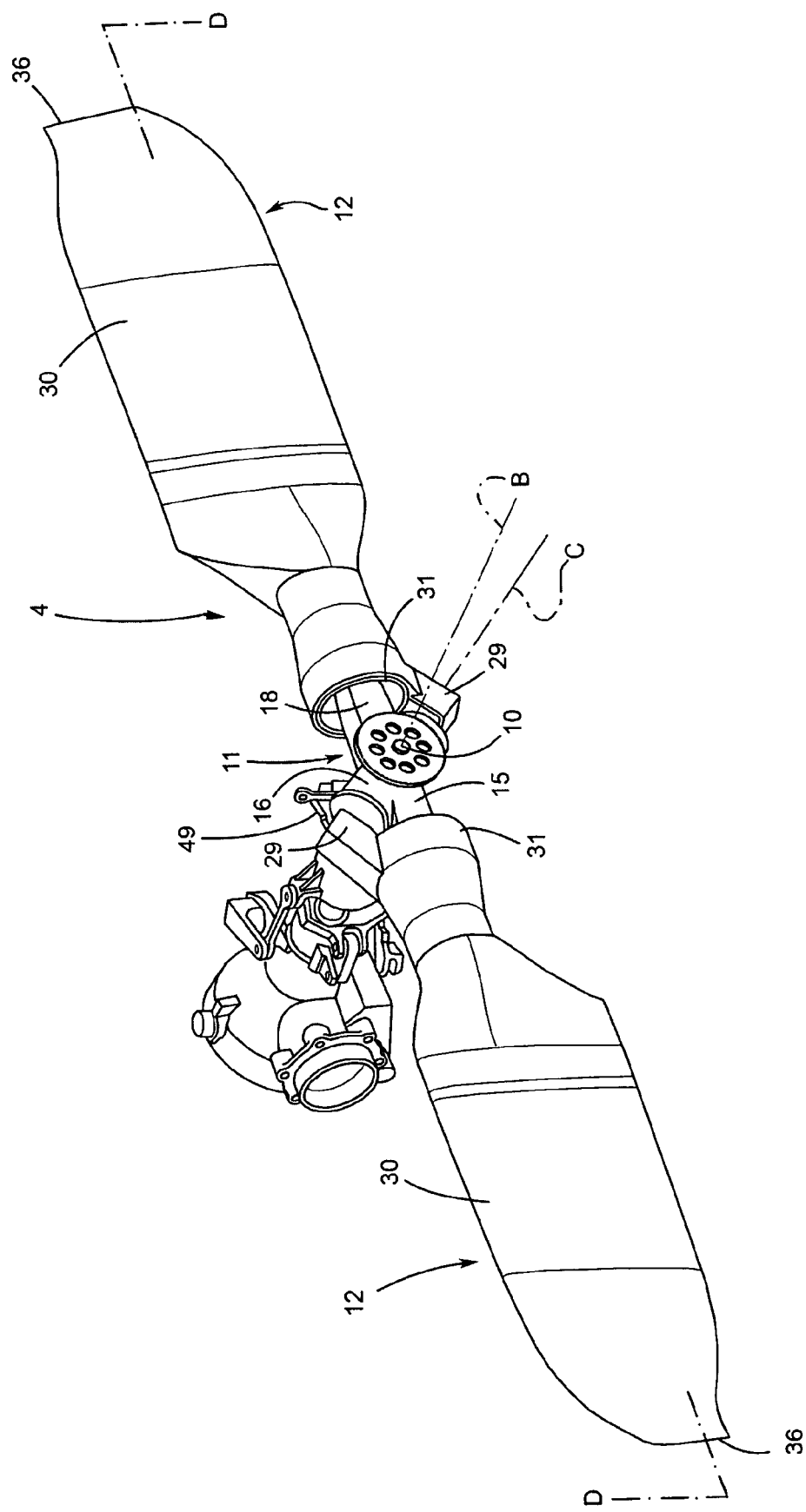
FIG. 2 shows a view in perspective of the FIG. 1 rotor.
Figure 3:
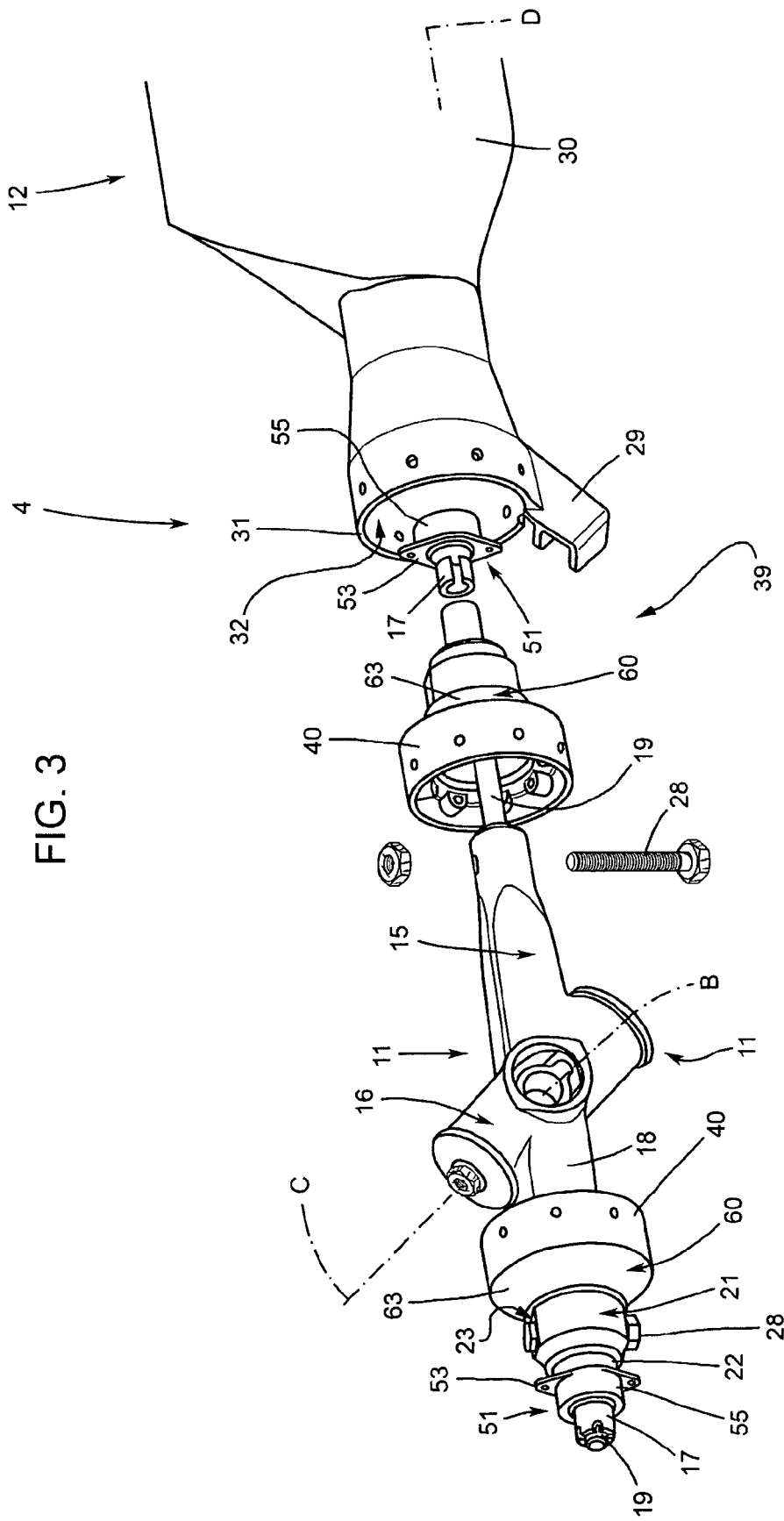
FIG. 3 shows, with parts removed for clarity, a stage in assembly of the FIGS. 1 and 2 rotor.

Number 1 in FIG. 1 indicates a helicopter substantially comprising a fuselage 2 with a nose 5; a main rotor 3 mounted on top of fuselage 2 and rotating about an axis A; and an antitorque tail rotor 4 fitted to a fin projecting from fuselage 2 at the opposite end to nose 5.

More specifically, main rotor 3 provides helicopter 1 with the lift and thrust necessary to lift and move helicopter 1 forward; while rotor 4 exerts force on the fin to produce a righting torque on fuselage 2 to balance the torque exerted on fuselage 2 by main rotor 3, and which would otherwise tend to rotate fuselage 2 about axis A.

Rotor 4 is a teetering or see-saw type, and substantially comprises (FIGS. 2 to 5):

a drive shaft 10 (only shown schematically in FIG. 2) rotating about an axis B crosswise to rotation axis A of main rotor 3;

a hub 11 fixed angularly with respect to shaft 10 about axis B and hinged to shaft 10 about an axis C perpendicular to axis B; and two blades 12 which project from hub 11 on opposite sides of axis B, are fixed angularly to hub 11 about axes B and C, and can be rotated with respect to hub 11, by external control, about respective axes D to adjust the respective angles of attack with respect to the airflow. More specifically, blades 12 are elongated along respective axes D, which, in the example shown, lie along the same line crosswise to axis B.

Figure 4:
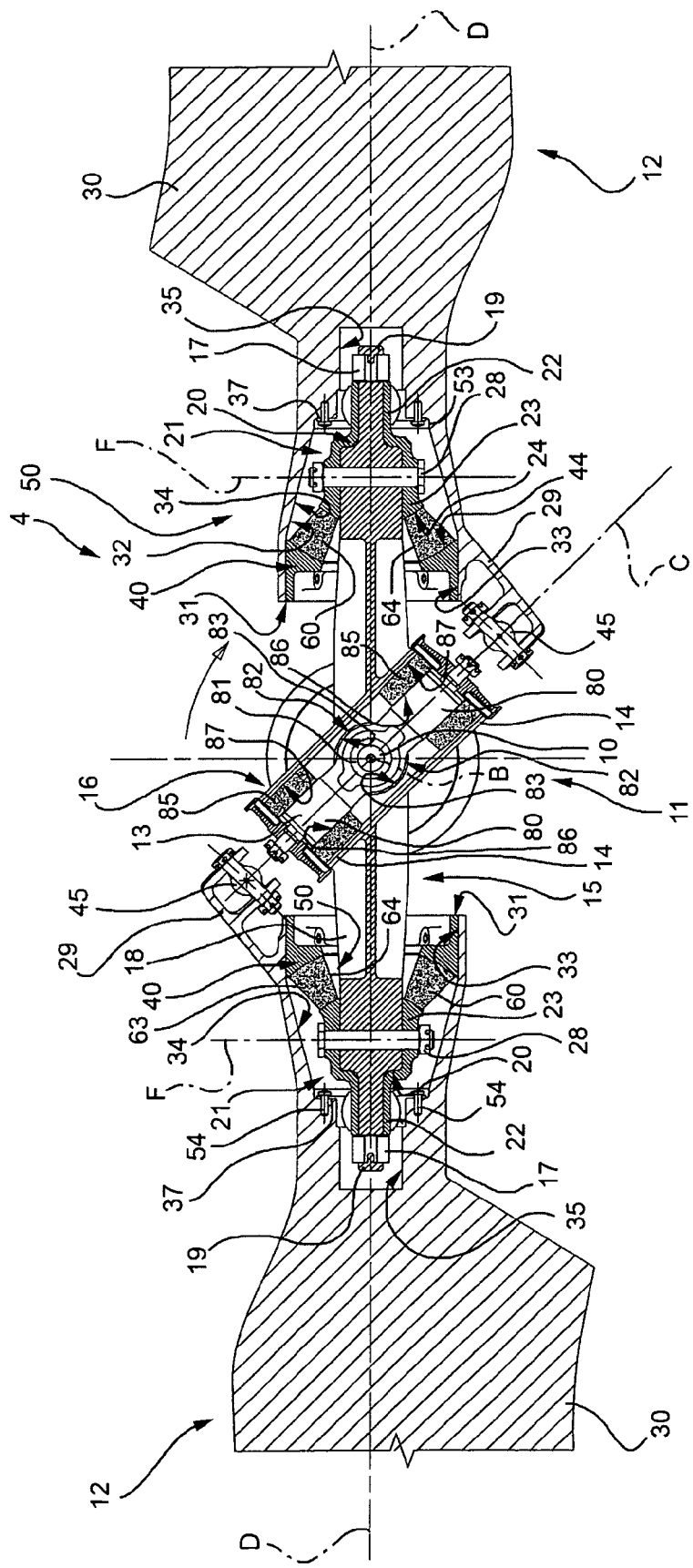
FIG. 4 shows a section of the FIG. 1-3 rotor in a plane parallel to the longitudinal extension of the blades.

As shown in FIG. 4, rotor 4 also comprises a member 13 elongated along axis C and rotating integrally with shaft 10 about axis B. More specifically, member 13 substantially comprises two end portions 80 located on opposite sides of axis B; and a central portion 81 interposed between end portions 80. Central portion 81 defines, radially inwards with respect to axis B, a seat engaged by shaft 10, and is bounded, radially outwards with respect to axis B, by two spherical surfaces 82 with coincident centres located along axis B.

Hub 11 substantially comprises:

a beam 15 elongated along axes D, and to which blades 12 are connected on opposite sides of axis B; and a crosspiece 16 elongated parallel to axis C, and fitted to member 13 and shaft 10 in rotary manner about axis C and in angularly fixed manner about axis B.

Crosspiece 16 defines two spherical surfaces 83 surrounding respective surfaces 82; surfaces 82, 83 have respective coincident centres located at the intersection of axes B and C; and crosspiece 16 slopes with respect to beam 15.

The crosspiece 16 and member 13 connection allows blades 12 to oscillate integrally with each other about axis C and with respect to shaft 10, so as to "flap" blades 12 and, more specifically, to compensate for the different aerodynamic loads on blades 12 caused by the different relative speeds of blades 12 with respect to the airflow.

Crosspiece 16 is formed integrally with and shorter in length than beam 15.

Beam 15 substantially comprises a main body 18 through which axis B extends; and two cylindrical appendixes 19 at radially opposite ends of main body 18 with respect to axis B.

More specifically, main body 18 decreases in thickness from axis B towards opposite appendixes 19; and appendixes 19 are smaller in diameter than the thickness of main body 18 crosswise to axis D.

Figure 5:
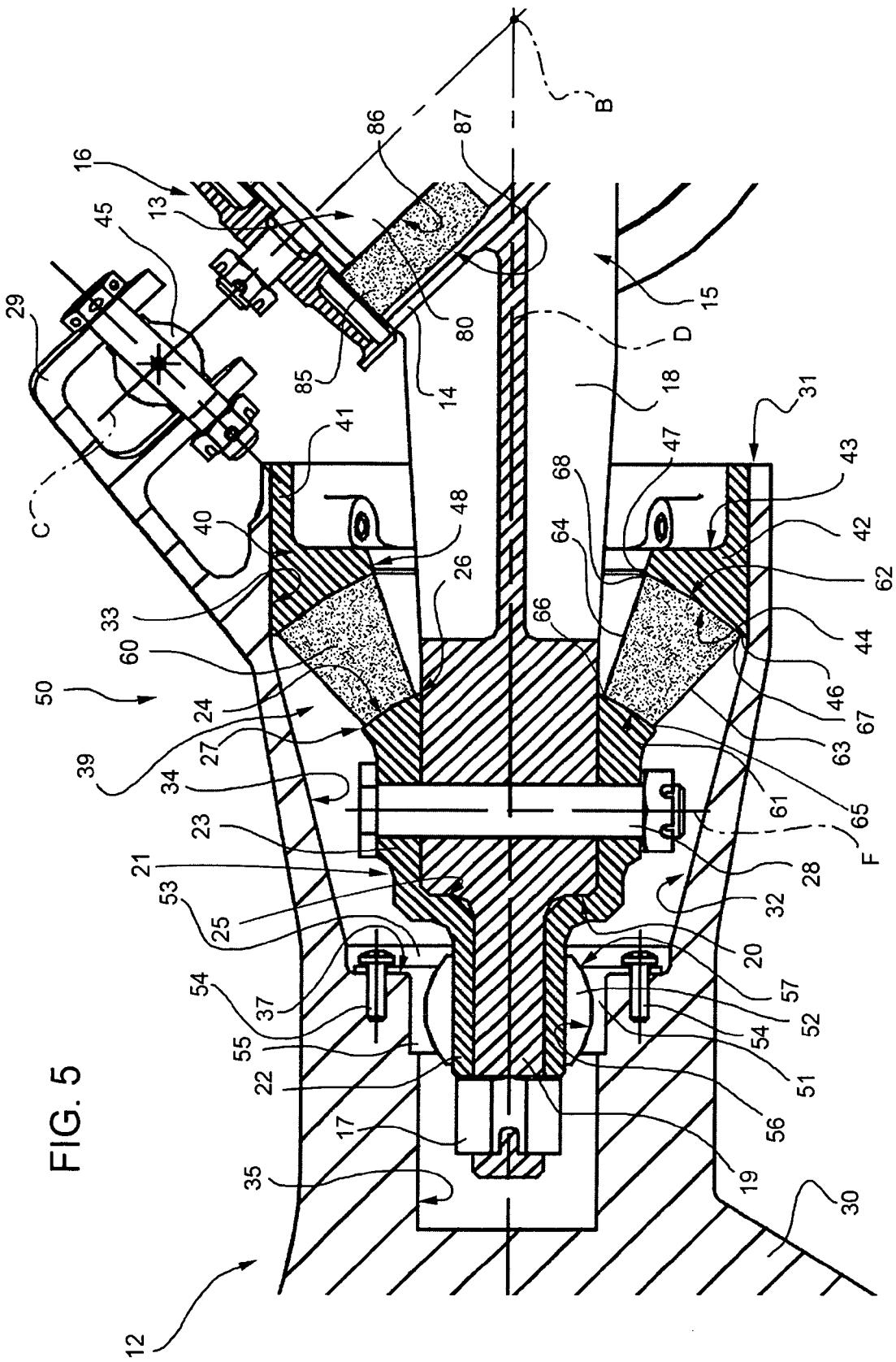
FIG. 5 shows larger-scale details of FIG. 4.

With reference to FIGS. 4 and 5, beam 15 also comprises two shoulders 20, each defined by a wall extending annularly about and perpendicular to relative axis D, and each interposed between main body 18 and respective appendix 19.

Hub 11 comprises two annular collars 21 symmetrical with respect to relative axes D. Each collar 21 comprises a portion 22 cooperating with and surrounding a portion of relative appendix 19 extending away from axis B from shoulder 20;

and a portion 23 cooperating with and surrounding a portion of main body 18 extending towards axis B from shoulder 20.

More specifically, collars 21 are tubular, and portions 22 of collars 21 are smaller in diameter than respective portions 23.

Each collar 21 also comprises a shoulder 25 (FIG. 5), which extends annularly about relative axis D, is interposed between relative portions 22, 23, and cooperates with a relative shoulder 20 of beam 15.

Each portion 23 terminates, radially inwards with respect to axis B, with an enlargement, which is radial with respect to axis D and defines a curved convex surface 24.

More specifically, each surface 24 comprises an annular edge 26 (FIG. 5) cooperating with main body 18; and an annular edge 27 opposite edge 26 and radially outwards of edge 26 with respect to relative axis D.

Edge 26 of each surface 24 is located radially inwards of relative edge 27 with respect to axis B.

For each blade 12, hub 11 comprises a bolt 28 formed by a screw, of axis F, extending through main body 18 and portion 23 of relative collar 21, and by a nut screwed to the screw.

More specifically, axes F of bolts 28 are perpendicular to axes D of respective blades 12 and crosswise to axis B.

Hub 11 also comprises two threaded members 17 screwed to respective appendixes 19 and cooperating with radially outer ends, with respect to axis B, of respective portions 22, so that each threaded member 17 exerts on corresponding portion 22 a force parallel to relative axis D and towards axis B.

Each blade 12 substantially comprises (FIGS. 3, 4, 5):
  a main body 30 defining a cavity 32 open at a radially inner end 31, with respect to axis B, of blade 12; and
  an arm 29 projecting from main body 30, obliquely with respect to relative axis D, and supporting a pin 45 whose axis is eccentric with respect to relative axis D. More specifically, each pin 45 receives a respective force, parallel to axis B, from a respective lever of a control assembly 49 shown in FIG. 2. And the forces parallel to axes B rotate respective blades 12 by the same angle and in the same direction with respect to relative axes B. More specifically, the axes of pins 45 are joined by axis C.

Each blade 12 also has an end 36 opposite end 31.

Cavity 32 of each blade 12 extends symmetrically with respect to relative axis D, and is closed at the end opposite relative end 31.

Starting from end 31 of relative blade 12 and working away from axis B, each cavity 32 comprises:
  a cylindrical portion 33 in which a ring 40 is fixed by a number of screws not shown in the drawings;
  a truncated-cone-shaped portion 34 tapering away from axis B and housing relative bolt 28 and portion 23 and shoulder 25 of relative collar 21; and
  a dead portion 35 housing a respective threaded member 17 and comprising three cylindrical portions decreasing in diameter from relative portion 34 and away from axis B.

More specifically, each cavity 32 decreases in diameter away from axis B, and the cylindrical portions of portion 35 are smaller in diameter than relative portion 33.

Each portion 34 has an annular shoulder 37 perpendicular to relative axis D.

Main body 18 of beam 15 extends partly outside blades 12, and partly inside portions 33, 34 of cavities 32.

Appendixes 19 of beam 15 extend partly inside portions 34 and partly inside portions 35 of relative cavities 32.

Portions 22 of collars 21 extend partly inside portions 33 and partly inside portions 34 of relative cavities 32.

Starting from end 31 of relative blade 12 and working away from axis B, each ring 40 comprises, integrally, a cylindrical portion 41 and an enlargement 42. Each ring 40 also comprises a shoulder 43 perpendicular to relative axis D and interposed between cylindrical portion 41 and enlargement 42.

More specifically, each enlargement 42 is bounded, radially inwards with respect to axis B, by shoulder 43, and radially outwards, with respect to axis B, by a curved concave surface 44.

Each surface 44 is bounded radially, with respect to relative axis D, by opposite edges 46, 47. More specifically, edge 47 of each surface 44 is located radially inwards of edge 46 with respect to relative axis D.

Edge 47 of each surface 44 is also located radially inwards of edge 46 with respect to axis B, so surfaces 44 extend at varying distances from axis B.

Enlargement 42 of each ring 40 also comprises a truncated-cone-shaped surface 48 tapering away from axis B and interposed between shoulder 43 and surface 44.

More specifically, each surface 48 defines relative enlargement 42 radially inwards with respect to relative axis D.

Rotor 4 also comprises supporting means 50 for supporting each blade 12 on hub 11, and which allow each blade 12 to rotate with respect to hub 11 about relative axis D.

More specifically, for each blade 12, supporting means 50 comprise (FIG. 5):
  a body 51 fixed to blade 12; and
  a member 52 fixed to portion 22 of relative collar 21, and connected to body 51 in rotary manner about relative axis D.

More specifically, each body 51 comprises integrally:
  a rhomboidal flange 53 elongated perpendicularly to relative axis D and fixed by two screws 54 to shoulder 37 of relative cavity 32; and
  a ring 55 bounded, radially inwards with respect to relative axis D, by a spherical surface 56, and cooperating, radially outwards with respect to relative axis D, with part of the contour of portion 35 of relative cavity 32.

More specifically, screws 54 are fixed on opposite sides of relative axis D, and have respective axes parallel to relative axis D.

Member 52 extends symmetrically with respect to relative axis D, and is bounded, radially outwards with respect to relative axis D, by a spherical surface 57 mating and cooperating with surface 56 of ring 55 of respective body 51.

More specifically, surfaces 56, 57 have respective coincident centres located along relative axis D.

Supporting means 50 advantageously comprise, for each blade 12, a supporting member 60 made at least partly of elastomeric material and interposed between surface 24 of relative portion 23 and surface 44 of relative ring 40. Each member 60 deforms, in use, to allow relative blade 12 to rotate with respect to hub 11 about relative axis D.

More specifically, each member 60 is annular with respect to axis D, and comprises:
  two opposite curved surfaces 61, 62 cooperating with surface 24 of portion 23 and surface 44 of enlargement 42 respectively; and
  two opposite truncated-cone-shaped surfaces 63, 64 extending between respective opposite ends of surfaces 61, 62.

More specifically, at least a portion of each enlargement 42 is located radially inwards of surface 62 of relative member 60 with respect to axis B, and at least a portion of each portion 23 is located radially outwards of surface 61 of relative member 60 with respect to axis B.

At least part of the centrifugal forces, with respect to axis B, acting on respective blades 12 is thus transmitted by members 60 to respective collars 21 and hence to hub 11.

Surfaces 61, 62 are concave and convex respectively, and define respective member 60 radially outwards and inwards respectively with respect to axis B.

Surfaces 61, 62 also extend at varying distances from axis B.

More specifically, each surface 61, 62 comprises an end edge 66, 68 radially inwards with respect to relative axis D; and an edge 65, 67 opposite edge 66, 68 and radially outwards with respect to relative axis D.

More specifically, edges 66, 68 are radially inwards of respective edges 65, 67 with respect to axis B. And, from respective edges 65, 67 to respective edges 66, 68, surfaces 61, 62 extend at first decreasing and then increasing distances with respect to axis B.

Surfaces 63, 64 define respective member 60 radially outwards and inwards respectively with respect to relative axis D, and surfaces 63, 64 of each member 60 converge from relative surface 62 towards relative surface 61.

Each member 60 comprises a number of layers of elastomeric material, in particular cured rubber; and a number of layers of metallic materials embedded in the layers of elastomeric material.

Surfaces 61, 62 of each member 60 are fixed to respective surfaces 24, 44 by layers of adhesive substances.

Each member 60 and relative collar 21 and ring 40 thus form a single assembly 30 which, at assembly (FIG. 3), is fixed to hub 11 by relative bolt 28. Next, threaded member 17 is screwed onto respective appendix 19, and body 51 is fixed to relative flange 53; assembly 39, with relative member 52 fitted to portion 22 of relative collar 21, is inserted inside relative cavity 32 to connect relative member 52 and body 51; and, finally, ring 40 is fixed to portion 33 of relative cavity 32 using the screws not shown.

Each member 60 is radially inwards of relative body 51 and member 52 with respect to axis B.

Rotor 4 advantageously comprises two bushes 85 (FIG. 4) which extend annularly about axis C, surround respective end portions 80 of member 13, and are in turn surrounded by respective opposite ends 14, on opposite sides of axis B, of crosspiece 16. More specifically, ends 14 define crosspiece 16 axially along axis C.

Bushes 85 allow crosspiece 16 to rotate with respect to member 13 about axis C, and therefore hub 11 to tilt with respect to shaft 10 about axis C.

Each bush 85 has a surface 86 radially inwards with respect to axis C and fixed to the radially outer surface, with respect to axis C, of relative end portion 80 of member 13; and a surface 87 radially outwards with respect to axis C and fixed to relative end 14 of crosspiece 16.

Each bush 85 is made at least partly of elastomeric material.

More specifically, bushes 85 comprise layers of elastomeric material, in particular cured rubber; and layers of metallic materials embedded in the layers of elastomeric material.

Surfaces 86, 87 of each bush 85 are fixed to end portion 80 and end 14 respectively by layers of adhesive substances.

In actual use, shaft 10 rotates about axis B to rotate hub 11 and blades 12 integrally with shaft 10.

Blades 12 are normally subjected to different aerodynamic loads having different components parallel to axis B, and which tilt blades 12 and hub 11 with respect to shaft 10 and about axis C, thus resulting in so-called flapping of blades 12.

More specifically, the aerodynamic loads tilt crosspiece 16 of hub 11 with respect to axis C and member 13 integral with shaft 10. As crosspiece 16 tilts with respect to axis C, surfaces 87 of bushes 85 follow crosspiece 16, whereas surfaces 86 of bushes 85 remain integral with member 13 in a fixed position with respect to axis C. As a result, the layers of elastomeric material of bushes 85 deform, thus allowing hub 11 to tilt with respect to shaft 10 about axis C.

While helicopter 1 is running, control assembly 49 can be operated to exert respective forces, parallel to axis B, on pins 45.

These forces rotate blades 12, with respect to hub 11, by the same angle and in the same direction about respective axes D to adjust the angles of attack of blades 12 with respect to the airflow.

Rotation of blades 12 about hub 11 is permitted by supporting means 50.

More specifically, blades 12 rotate surfaces 44 of respective rings 40 and surfaces 56 of bodies 51 about relative axes D, whereas members 52 and collars 21 remain integral with hub 11 and therefore fixed with respect to rotation of respective blades 12.

More specifically, surfaces 56 rotate about respective axes D about surfaces 57 of relative bodies 51.

Surfaces 62 of members 60 follow surfaces 44 of relative enlargements 42 as the blades rotate about respective axes D, whereas surfaces 61 of members 60 remain contacting respective surfaces 24 and therefore do not follow blades 12 as they rotate about axes D.

As a result, the layers of elastomeric material of members 60 deform elastically to allow blades 12 to rotate about respective axes D with respect to hub 11.

The centrifugal force acting on each blade 12 is directed perpendicular to and outwards of axis B.

More specifically, a first part of the centrifugal force is transmitted by each ring 40 to relative member 60, and from this to portion 23 of relative collar 21; and a second part is transmitted by each body 51 to relative member 52, and from this to portion 22 of relative collar 21.

The centrifugal force transmitted, parallel to relative axis D and away from axis B, to each collar 21 is balanced by the constraint reactions of relative bolt 28 and threaded member 17.

The advantages of rotor 4 according to the present invention will be clear from the above description.

In particular, members 60 comprising layers of elastomeric material are subject to far less wear than a conventional rolling bearing or an all-metal supporting member.

By virtue of members 60, supporting means 50 therefore provide for cheaply, reliably, and accurately supporting respective blades 12 in rotary manner with respect to hub 11 about respective axes D.

Rotor 4 therefore combines, reliably and cheaply, the advantages of a configuration, such as a see-saw rotor, comprising only a small number of parts, with the possibility of adjusting the angles of attack of blades 12 with respect to the airflow.

Moreover, members 60 comprising a number of layers of elastomeric material, it is possible, when designing or servicing rotor 4, to determine one or more characteristic oscillation frequencies of blades 12 along respective axes D and/or perpendicular to respective axes D and parallel to axis B, and so design member 60 to damp such oscillation.

In other words, assemblies 39 (FIGS. 3 and 5) define "dynamic dampers" interposed between respective blades 12 and hub 11, and which, when designing or servicing the rotor, can be "tuned" to predetermined oscillation frequencies of blades 12 along respective axes D and/or perpendicular to respective axes D and parallel to axis B.

Enlargements 42 of rings 40 subject members 60 to respective forces having both radial and axial components with respect to relative axes D.

Which means that, besides enabling rotation of respective blades 12 on hub 11, members 60 also provide—reliably, at little cost, and with little wear—for transmitting respective parts of the centrifugal forces acting on respective blades 12 to portions 23 of collars 21 and from these to hub 11.

Moreover, each bolt 28 and threaded member 17 exert on respective collar 21 respective constraint reactions directed parallel to axis D and towards axis B, and which counteract the centrifugal force transmitted by respective member 60 and member 52 to respective collar 21, thus ensuring collar 21 remains in the correct position on hub 11.

More specifically, threaded members 17 constitute structural "redundancies", i.e. provide for counteracting the centrifugal forces, even in the event of damage to respective bolts 28, thus greatly enhancing the reliability and safety of rotor 4.

Finally, comprising layers of elastomeric material, bushes 85 provide for supporting hub 11 on shaft 10 in rotary manner about axis C with very little wear and therefore extremely reliably.

Clearly, changes may be made to rotor 4 as described and illustrated herein without, however, departing from the scope defined in the accompanying Claims.

In particular, one or both of surfaces 61, 62 and one or both of corresponding surfaces 24, 44 may be perpendicular to relative axis D.

Also, one or both of surfaces 63, 64 may be parallel to relative axis D.

The invention claimed is:

1. A rotor (4) for a helicopter (1), the rotor comprising
   a drive shaft (10) rotating about a first axis (B);
   a hub (11) connected functionally to said drive shaft (10) in angularly fixed manner with respect to said first axis (B) and in rotary manner with respect to a second axis (C) crosswise to said first axis (B);
   at least two blades (12) connected functionally to said hub (11) in angularly fixed manner with respect to said first and second axis (B, C) and in rotary manner with respect to respective third axes (D); and
   supporting means (50) for supporting said blades (12) with respect to said hub (11) in rotary manner about the respective third axes (D);
   the rotor being characterized in that said supporting means (50) comprise at least one supporting member (60) made at least partly of elastomeric material and interposed between a first surface (44), and a second surface (24) integral with a respective said blade (12) and with said hub (11) respectively; said supporting member (60) deforming, in use, to permit rotation of said respective blade (12), with respect to said hub (11), about said respective third axis (D).

2. A rotor as claimed in claim 1, characterized in that said supporting member (60) comprises a third surface (62) cooperating with said first surface (44), and a fourth surface (61) cooperating with said second surface (24); said rotor (4) comprising a first member (40) integral with said respective blade (12) and defining said first surface (44), and a second member (21) integral with said hub (11) and defining said second surface (24); said first member (40) being located, at least partly, radially inwards of said third surface (62) with respect to said first axis (B), and said second member (21) being located, at least partly, radially outwards of said fourth surface (61) with respect to said first axis (B).

3. A rotor as claimed in claim 2, characterized in that said third and fourth surface (62, 61) are held contacting said first and second surface (44, 24) respectively by an adhesive substance.

4. A rotor as claimed in claim 2, characterized in that at least one of said third and fourth surface (62, 61) extends at varying radial distances from said first axis (B).

5. A rotor as claimed in claim 3, characterized in that said third and fourth surface (62, 61) are curved.

6. A rotor as claimed in claim 5, characterized in that said fourth surface (61) is concave, and said third surface (62) is convex.

7. A rotor as claimed in claim 2, characterized in that said supporting member (60) comprises a fifth and a sixth surface (64, 63) which are in the shape of lateral surfaces of respective truncated cones coaxial with said respective third axis (D), and are interposed between said third and fourth surface (62, 61); said fifth surface (64) defining said supporting member (60) radially inwards with respect to said respective third axis (D), and said sixth surface (63) defining said supporting member (60) radially outwards with respect to said respective third axis (D).

8. A rotor as claimed in claim 7, characterized in that said fifth and sixth surface (64, 63) converge from said first surface (44) to said second surface (24).

9. A rotor as claimed in claim 1, characterized in that said supporting member (60) is annular with respect to said respective third axis (D).

10. A rotor as claimed in claim 7, characterized in that said fifth and sixth surface (64, 63) taper from said first surface (44) to said second surface (24).

11. A rotor as claimed in claim 1, characterized in that said supporting means (50) comprise a first body (52) and a second body (51) integral with said hub (11) and said respective blade (12) respectively, and connected with respect to each other to rotate about said respective third axis (D).

12. A rotor as claimed in claim 11, characterized in that said supporting member (60) is located radially inwards of said first and second body (51, 52) with respect to said first axis (B).

13. A rotor as claimed in claim 12, characterized in that said second body (52) is fitted to said second member (21).

14. A rotor as claimed in claim 2, characterized in that said hub (11) comprises a beam (15); and by comprising a first constraint device (28) connecting said beam (15) to said second member (21) and elongated crosswise to said respective third axis (D) and said first axis (B).

15. A rotor as claimed in claim 14, characterized by comprising a second constraint device (17) fitted to said beam (15) and cooperating with a radially outer end, with respect to said first axis (B), of said second member (21).

16. A rotor as claimed in claim 1, characterized by comprising a further supporting member (85) made at least partly of elastomeric material and interposed between said hub (11) and said drive shaft (10); said further supporting member (85) deforming, in use, to permit rotation of said hub (11), with respect to said drive shaft (10), about said second axis (C).

17. A helicopter comprising a main rotor (2); and an anti-torque tail rotor (4) as claimed in claim 1.

* * * * *